United States Patent
Noro et al.

(10) Patent No.: US 7,035,182 B2
(45) Date of Patent: Apr. 25, 2006

(54) DECODER

(75) Inventors: Satoshi Noro, Gifu-ken (JP);
Shin-ichiro Tomisawa, Mizuho (JP)

(73) Assignee: Sanyo Electric Co., Ltd., Osaka (JP)

( * ) Notice: Subject to any disclaimer, the term of this patent is extended or adjusted under 35 U.S.C. 154(b) by 292 days.

(21) Appl. No.: 10/770,778

(22) Filed: Feb. 3, 2004

(65) Prior Publication Data
US 2004/0156282 A1  Aug. 12, 2004

(30) Foreign Application Priority Data

| Feb. 6, 2003 | (JP) | ............................. 2003-029853 |
| Dec. 3, 2003 | (JP) | ............................. 2003-404428 |

(51) Int. Cl.
*G11B 20/10* (2006.01)

(52) U.S. Cl. .............................. 369/47.21; 369/53.35; 369/59.26; 369/124.08

(58) Field of Classification Search ..................... None
See application file for complete search history.

(56) References Cited

U.S. PATENT DOCUMENTS

| 5,604,723 | A  * | 2/1997 | Kikuta ..................... 369/47.32 |
| 6,263,469 | B1 * | 7/2001 | Jang ........................ 369/47.28 |
| 6,272,194 | B1 * | 8/2001 | Sakamoto ................... 375/368 |
| 6,707,626 | B1 * | 3/2004 | Esumi ......................... 360/51 |
| 6,879,771 | B1 * | 4/2005 | Yoshida et al. .......... 369/47.28 |
| 2003/0086348 | A1 * | 5/2003 | Takahashi ................ 369/53.34 |

FOREIGN PATENT DOCUMENTS

JP    2003178535 A  *  6/2003

OTHER PUBLICATIONS

Patent Abstracts of Japan, Publication No. 2001-236738, Date of Publication: Aug. 31, 2001, Application No. 2000-046965, 9 pages.

* cited by examiner

*Primary Examiner*—Thang V. Tran
(74) *Attorney, Agent, or Firm*—Fish & Richardson P.C.

(57) ABSTRACT

A decoder for improving the reliability of synchronization pattern detection. The decoder includes a synchronization circuit for detecting a synchronization pattern from LPP data and wobble data. A first frame counter is reset when a synchronization detection circuit detects the synchronization pattern of a first sector and counts the number of frames of data until the synchronization pattern of the next sector is detected. A comparison circuit compares a count value of the first frame counter with a first reference value, which corresponds to the number of frames for one sector. A determination circuit determines whether or not the detected synchronization pattern is proper based on the comparison result of the comparison circuit.

10 Claims, 5 Drawing Sheets

Fig. 4(a)

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| 1 | 1 | 1 | 1 | 0 | 0 | 0 | 0 | 0 | 0 | 0  | 0  | 0  | 0  | 0  | 0  | 0  |
| 2 | X | 0 | 1 | 0 | 0 | 0 | 0 | 0 | 0 | 0  | 0  | 0  | 0  | 0  | 0  | 0  |
| 3 | X | 0 | 1 | 0 | 0 | 0 | 0 | 0 | 0 | 0  | 0  | 0  | 0  | 0  | 0  | 0  |

Fig. 4(b)

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| 1 | 1 | 1 | 1 | 0 | 0 | 0 | 0 | 0 | 0 | 0  | 0  | 0  | 0  | 0  | 0  | 0  |
| 2 | 0 | 0 | 0 | 0 | 0 | 0 | 0 | 0 | X | 0  | 1  | 0  | 0  | 0  | 0  | 0  |
| 3 | 0 | 0 | 0 | 0 | 0 | 0 | 0 | 0 | X | 0  | 1  | 0  | 0  | 0  | 0  | 0  |

Fig. 4(c)

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| 1 | 1 | 1 | 1 | 0 | 0 | 0 | 0 | 0 | 0 | 0  | 0  | 0  | 0  | 0  | 0  | 0  |
| 2 | X | 0 | 1 | 0 | 0 | 0 | 0 | 0 | 0 | 0  | 0  | 0  | 0  | 0  | 0  | 0  |
| 3 | 0 | 0 | 0 | 0 | 0 | 0 | 0 | 0 | X | 0  | 1  | 0  | 0  | 0  | 0  | 0  |

Fig. 4(d)

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| 1 | 1 | 1 | 1 | 0 | 0 | 0 | 0 | 0 | 0 | 0  | 0  | 0  | 0  | 0  | 0  | 0  |
| 2 | 0 | 0 | 0 | 0 | 0 | 0 | 0 | 0 | X | 0  | 1  | 0  | 0  | 0  | 0  | 0  |
| 3 | X | 0 | 1 | 0 | 0 | 0 | 0 | 0 | 0 | 0  | 0  | 0  | 0  | 0  | 0  | 0  |

Fig. 4(e)

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| 1 | 0 | 1 | 1 | 0 | 0 | 0 | 0 | 0 | 0 | 0  | 0  | 0  | 0  | 0  | 0  | 0  |
| 2 | X | 0 | 1 | 0 | 0 | 0 | 0 | 0 | 0 | 0  | 0  | 0  | 0  | 0  | 0  | 0  |
| 3 | X | 0 | 1 | 0 | 0 | 0 | 0 | 0 | 0 | 0  | 0  | 0  | 0  | 0  | 0  | 0  |

Fig. 4(f)

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| 1 | 0 | 1 | 1 | 0 | 0 | 0 | 0 | 0 | 0 | 0  | 0  | 0  | 0  | 0  | 0  | 0  |
| 2 | 0 | 0 | 0 | 0 | 0 | 0 | 0 | 0 | X | 0  | 1  | 0  | 0  | 0  | 0  | 0  |
| 3 | 0 | 0 | 0 | 0 | 0 | 0 | 0 | 0 | X | 0  | 1  | 0  | 0  | 0  | 0  | 0  |

Fig. 4(g)

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| 1 | 0 | 1 | 1 | 0 | 0 | 0 | 0 | 0 | 0 | 0  | 0  | 0  | 0  | 0  | 0  | 0  |
| 2 | X | 0 | 1 | 0 | 0 | 0 | 0 | 0 | 0 | 0  | 0  | 0  | 0  | 0  | 0  | 0  |
| 3 | 0 | 0 | 0 | 0 | 0 | 0 | 0 | 0 | X | 0  | 1  | 0  | 0  | 0  | 0  | 0  |

Fig. 4(h)

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|----|----|----|----|----|----|----|
| 1 | 0 | 1 | 1 | 0 | 0 | 0 | 0 | 0 | 0 | 0  | 0  | 0  | 0  | 0  | 0  | 0  |
| 2 | 0 | 0 | 0 | 0 | 0 | 0 | 0 | 0 | X | 0  | 1  | 0  | 0  | 0  | 0  | 0  |
| 3 | X | 0 | 1 | 0 | 0 | 0 | 0 | 0 | 0 | 0  | 0  | 0  | 0  | 0  | 0  | 0  |

Fig. 6

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 1 | 1 | 1 | 0 | 0 | 0 | 0 | 0 | 0 | 0 | 0 | 0 | 0 | 0 | 0 | 0 |
| 2 | X | 0 | 1 | 0 | 0 | 0 | 0 | 0 | 0 | 0 | 0 | 0 | 0 | 0 | 0 | 0 |
| 3 | X | 0 | 1 | 0 | 0 | 0 | 0 | 0 | 0 | 0 | 0 | 0 | 0 | 0 | 0 | 0 |

Fig. 7

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 1 | 1 | 1 | 0 | 0 | 0 | 0 | 0 | 0 | 0 | 0 | 0 | 0 | 0 | 0 | 0 |
| 2 | X | 0 | 1 | 0 | 0 | 0 | 0 | 0 | 0 | 0 | 0 | 0 | 0 | 0 | 0 | 0 |
| 3 | X | 0 | 1 | 0 | 0 | 0 | 0 | 0 | 0 | 0 | 0 | 0 | 0 | 0 | 0 | 0 |

DECODER

RELATED APPLICATIONS

Under 35 USC 119, this application claims the benefit of a foreign priority applications filed in Japan, serial number 2003-029853, filed Feb. 6, 2003 and serial number 2003-404428, filed Dec. 3, 2003.

BACKGROUND OF THE INVENTION

The present invention relates to a decoder, and more particularly, to a decoder for detecting a synchronization pattern from a land pre-pit (LPP) read from an optical disc.

An optical disc device using an optical disc recording medium is a data recording device that records data on a recording medium. An example of such an optical disc device is a DVD-R/RW system that uses digital versatile disc-recordable (DVD-R) or digital versatile disc-rewritable (DVD-RW) discs, which enable high density recording. FIG. 1 is a schematic diagram illustrating a logic format for DVD data used in a DVD-R disc or a DVD-RW disc. In the DVD data, a SYNC pattern having a length of 32 bits and recording data having a length of 1456 bits configure the data of a single frame. The frame data of a total of 26 frames, from frame 0 to frame 25, configure the data of a single sector. The 26 frames of data are divided into even frames and odd frames to configure an array of 2 columns and 13 rows of data.

In a DVD-R/RW system that handles DVD data having such a logic format, groove tracks, which function as guide grooves, are formed in the disc to enable the system to properly recognize the tracks of the disc even when data is not recorded on the disc. Each groove track has a slightly wobbled structure, which is normally referred to as a wobble. Address pits, which are referred to as land pre-pits (LPPs), are formed adjacent to the groove tracks in land tracks. The system traces the wobble and the LPPs to generate a wobble signal and an LPP signal, which include record address information of the disc or a synchronization pattern for writing data. The wobble signal and the LPP signal are decoded to retrieve the address information and the synchronization pattern in order to accurately write data to a predetermined recording area of the disc to which data has not yet been recorded.

FIG. 2 is a waveform diagram showing an example of a wobble signal and an LPP signal. The wobble signal is a signal having a constant cycle. Eight cycles of the wobble signal is allocated for a data recording area having a length corresponding to a signal frame. In other words, the wobble of the disc is formed so that the oscillation of the wobble signal is repeated eight times when the laser beam traces a track over a length corresponding to a single frame.

The LPP signal is a whisker-like signal superposed with the wobble signal and appears in the first three cycles of the wobble signal of a frame. The LPP signal is read as an analog signal, as shown in FIG. 2, and then binarized based on whether or not the whisker-like signal exists. Subsequently, a pattern having eight bits is configured for each frame. A set of three bits at the head of the eight bits represent the information required to control writing. The LPP signal does not appear at the head of every frame. Among two successive frames, such as frames 0 and 1; 2 and 3; 4 and 5; . . . ; and 24 and 25; the LPP signal appears only in either the even frame or the odd frame. Among the 26 frames that configure a single sector, the three bit pattern configures the synchronization pattern of the two head frames, which are frame 0 and frame 1. In each pair of the other frames, the three bit pattern configures record address information of the disc.

Different synchronization patterns are allocated to frame 0 and frame 1. That is, "1, 1, 1" is allocated to frame 0 and "1, 1, 0" is allocated to frame 1. Thus, when an LPP signal matching "1, 1, 1" or "1, 1, 0" is acquired, the DVD-R system determines that that position is allocated on the disc for the head of the data recording area of a single sector.

In the record address information, the three bit LPP signal is converted to one bit data in accordance with a predetermined conversion table in the manner of, for example, "1, 0, 0"→"0" and "1, 0, 1"→"1" so that the twelve frames excluding frame 0 or frame 1 configure twelve bits of data. The twelve bit data represents track information and record address information of the disc.

In the three bit data, "1" is always recorded in the first bit. In the DVD-R system, the SYNC pattern of the data subject to recording is recorded in correspondence with the first bit.

The DVD-R/RW system reads and binarizes the LPPs recorded on a disc. The DVD-R/RW uses the binarized LPP data to generate a clock for controlling data writing and to manage the record addresses on the disc. Thus, even when data has not yet been recorded to the disc, data is recorded at the proper recording position in the proper order in compliance with the logic format. However, when reproducing the LPP data from the disc, the heat generated by a laser beam may result in a missing bit or noise may cause other bit patterns to be erroneously recognized as the synchronization pattern. In such case, the synchronization pattern or address information of the disc may not be acquired properly. This would interfere with the proper writing of data.

It is an object of the present invention to provide decoder that improves the reliability of synchronization pattern detection even when an LPP is missing or when erroneous reading occurs.

SUMMARY OF THE INVENTION

To achieve the above object, the present invention provides a decoder for decoding reproduction data of a land pre-pit. The reproduction data includes a synchronization pattern allocated in a predetermined cycle. The decoder includes a detection circuit for comparing the reproduction data with synchronization data corresponding to the synchronization pattern and generating a detection signal when the synchronization pattern of the reproduction data matches the synchronization data. A counter is connected to the detection circuit for performing counting in response to the detection signal and generating a count value corresponding to a matching detection cycle of the synchronization pattern. A determination circuit is connected to the counter for comparing the count value of the counter with a reference value corresponding to an allocating cycle of the synchronization pattern and determining whether or not the synchronization pattern, detected to be matching the synchronization data by the detection circuit, is proper.

A further aspect of the present invention is a decoder for decoding data of a plurality of sectors, including first sector data and second sector data. Each piece of sector data includes a plurality of frames, with a synchronization pattern of a land pre-pit being allocated to a predetermined frame of each sector. The decoder includes a detection circuit for comparing the first sector data with synchronization data corresponding to the synchronization pattern and for generating a first detection signal when the synchronization pattern of the first sector data matches the synchronization data. The detection circuit compares the second sector data with the synchronization data corresponding to the synchronization pattern after generating the first detection signal to generate a second detection signal when the synchronization pattern of the second sector data matches the synchronization data. A first counter is connected to the detection circuit for performing counting in response to the first detection signal and for generating a count value, in response to the second detection signal, of a frame number when matching of the synchronization pattern of the second sector data is detected. A determination circuit is connected to the first counter for comparing the count value of the first counter with a reference value corresponding to the predetermined frame to which the synchronization pattern is allocated and for determining whether or not the synchronization pattern of the first sector, detected to be matching the synchronization data by the detection circuit, is proper based on the comparison result.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 4(a) through 4(h) are a diagram showing examples of data patterns stored in a ROM of the decoder of FIG. 3;

FIG. 6 is a diagram illustrating a comparison determination process performed by a determination section of the decoder of FIG. 3; and FIG. 7 is a diagram illustrating the comparison determination process performed by the determination section of the decoder of FIG. 3.

DETAILED DESCRIPTION OF THE PREFERRED EMBODIMENTS

Figure 1:
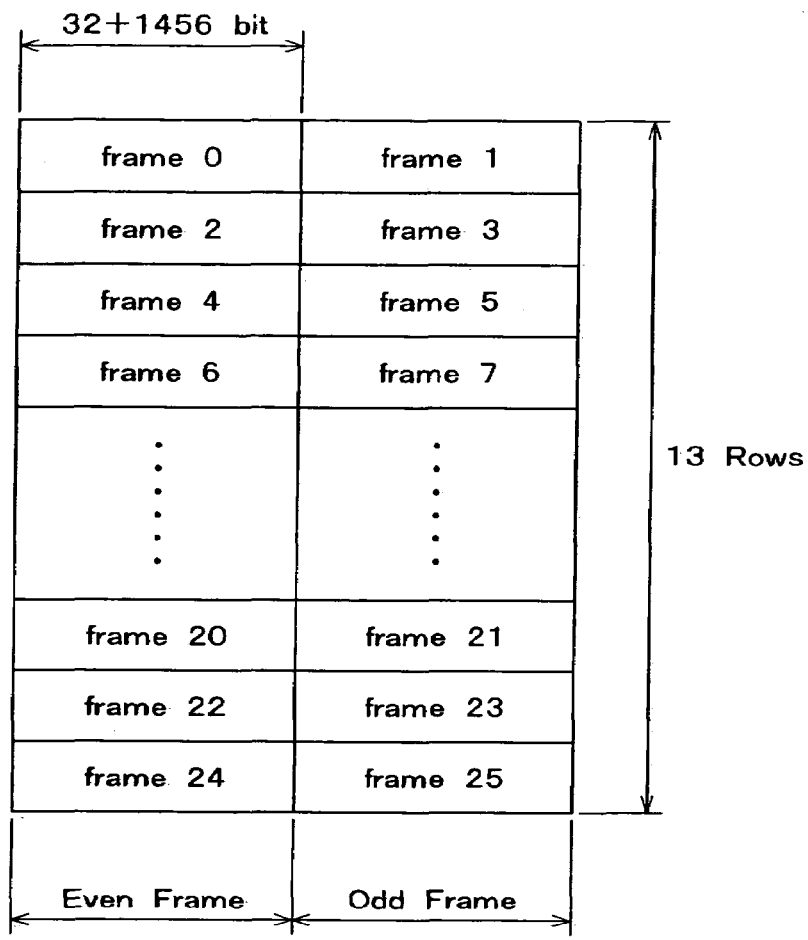
FIG. 1 is a schematic diagram illustrating a logic format for DVD data.
Figure 2:
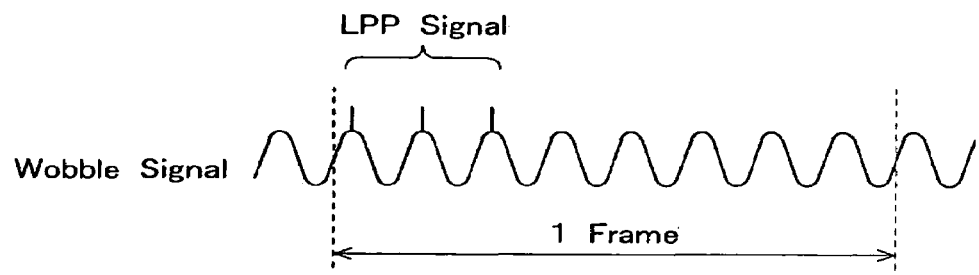
FIG. 2 is a waveform diagram showing an example of an LPP signal and a wobble signal.
Figure 3:
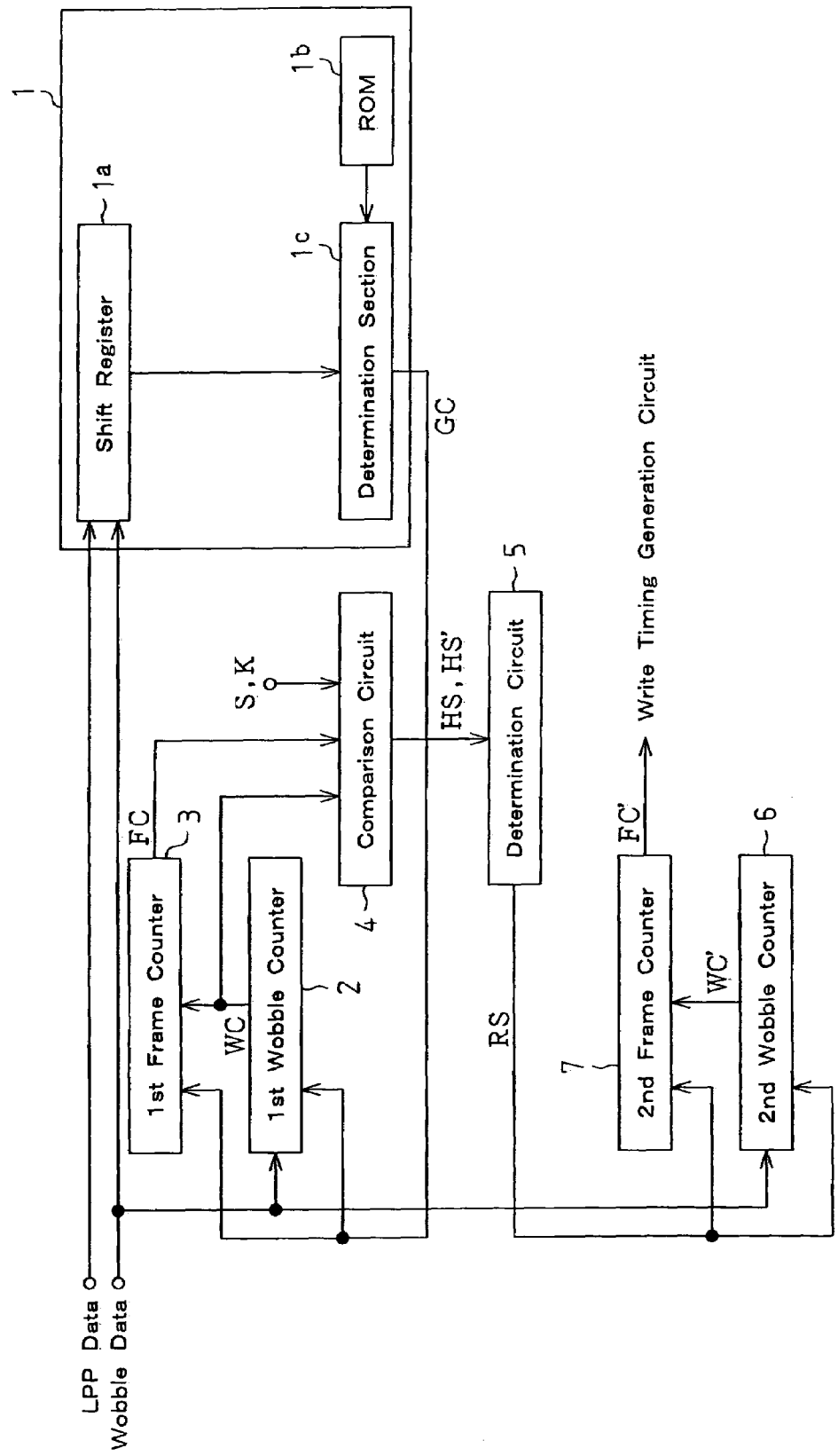
FIG. 3 is a schematic block diagram of a decoder according to a preferred embodiment of the present invention.

A decoder 100 according to a preferred embodiment of the present invention will now be described with reference to the block diagram of FIG. 3. The decoder 100 includes a synchronization detection circuit 1, a first wobble counter 2, a first frame counter 3, a comparison circuit 4, a determination circuit 5, a second wobble counter 6, and a second frame counter 7.

The synchronization detection circuit 1 includes a shift register 1a, a ROM 1b, and a determination section 1c. An extraction circuit (not shown) extracts land pre-pit (LPP) data and wobble data from a signal read from a DVD disc. The synchronization detection circuit 1 receives the LPP and wobble data to detect a synchronization pattern from the LPP and wobble data.

The shift register 1a successively receives the wobble data and the LPP data and stores, for example, six frames, or a total of 48 bits, of LPP data. The wobble data and the LPP data are provided in a binary state to the shift register 1a. In the wobble data, a wobble signal is standardized based on a predetermined threshold value, and eight bits of data are generated for one frame. In the LPP data, the sampling frequency during binarization is set at the same frequency as the wobble data and binarization is performed in accordance with whether an LPP signal is detected. As a result, the LPP data has eight bits for one frame like the wobble data, and the first three bits represent a synchronization pattern or record address information. The remaining five bits are all "0".

A ROM 1b, which is a read-only recording memory, stores synchronization data corresponding to the three bits of the synchronization pattern and the data pattern corresponding to the frames of part of the previous sector of the sector that includes the frame to which the synchronization pattern is added. The data pattern may correspond to the frames of part of the subsequent sector of the sector including the synchronization pattern. Plural pieces of data set in accordance with the pattern of the LPP data are stored in the ROM 1b. FIG. 4(a) shows an example of the data stored in the ROM 1b. The data pattern of FIG. 4(a) corresponds to a state in which the synchronization pattern "1, 1, 1" is added to frame 0 and the address pattern of "1, 0, X (X being 0 or 1)" is added to an even frame. The pattern shown here corresponds to the first three bits (synchronization data) of frame 0 in the nth (n being an integer) sector, the eight bits of each of frames 25 to 21 in the (n−1)th sector, and the last five bits of frame 20 in the (n−1)th sector. With regard to the synchronization pattern of the first three bits, the synchronization pattern of "1, 1, 0" may be added to frame 1, and the address pattern may be added to the even frames or the odd frames. Thus, when holding the data pattern of six frames, the ROM 1b stores eight patterns of data as shown in FIGS. 4(a) to 4(h).

In FIG. 4, the three bits in the first to third columns of the first row configure the synchronization signal of the frame most recently retrieved in the shift register 1a. The bits from the fourth column of the first row are an LPP signal that includes the address pattern of the previous frame. The determination section 1c receives and compares the data stored in the shift register 1a and the data stored in the ROM 1b to determine whether the two pieces of data matches. Then, the determination section 1c detects the synchronization pattern from the LPP data based on the determination results. When the synchronization pattern is detected, the determination section 1c provides the first wobble counter 2 and the first frame counter 3 with a detection signal GC.

The first wobble counter 2 retrieves the successively received wobble data and counts the wobble data in units of one bit. The first wobble counter 2 is set to perform counting in the range of "0" to "15". After the data corresponding to two frames are counted and the count value WC becomes "15", the count value WC is reset to "0".

In response to the count value output from the first wobble counter 2, the first frame counter 3 counts the LPP data in frame units. The first frame counter 3 increments a count value FC whenever the count value WC of the first wobble counter 2 becomes "0" or "8". The first frame counter 3 is set to perform counting in the range of "0" to "25" since one sector has twenty-six frames. After data corresponding to one sector is counted and the count value FC becomes "25", the count value FC is reset to "0".

The comparison circuit 4 compares the count value FC of the first frame counter 3 in accordance with a first reference value S, which is set in accordance with how frequent the synchronization pattern appears, to generate a comparison signal HS. The first reference value S is a value determined in accordance with the number of frames in a sector and is set to "0" or "1" for the count value FC of the frame counter. This is because 26 frames configure one sector and the synchronization pattern is recorded to either frame 0 or frame 1. The comparison circuit 4 compares the count value WC of the first wobble counter 2 with a second reference value K, which corresponds to the head of frame 0 or frame 1, to output a comparison signal HS'. The second reference value K is set in accordance with whether the synchronization pattern is added to the head of frame 0 or frame 1. The second reference value K is set to "2" or "10" for the count value WC of the first wobble counter 2.

Based on the comparison result of the comparison circuit 4, the determination circuit 5 determines whether or not the synchronization detection circuit 1 has detected the proper synchronization. When determining that the proper synchronization pattern has been detected, the determination circuit 5 provides the reset signal RS to the second wobble counter 6 and the second frame counter 7. The second wobble counter 6 and the second frame counter 7 respectively have the same configuration as the first wobble counter 2 and the first frame counter 3. The second wobble counter 6 counts the wobble data. Based on the count value, the second frame counter 7 counts the number of frames based on the count value of the second wobble counter 6. Among the second wobble counter 6 and the second frame counter 7, the output signal of the second frame counter 7 is used as a clock signal, which is provided to a write timing generation circuit (not shown) in the next stage. The write timing generation circuit generates a reference clock signal required for writing data and determines the timing for writing recording data in accordance with the track position of the disc.

Figure 5:
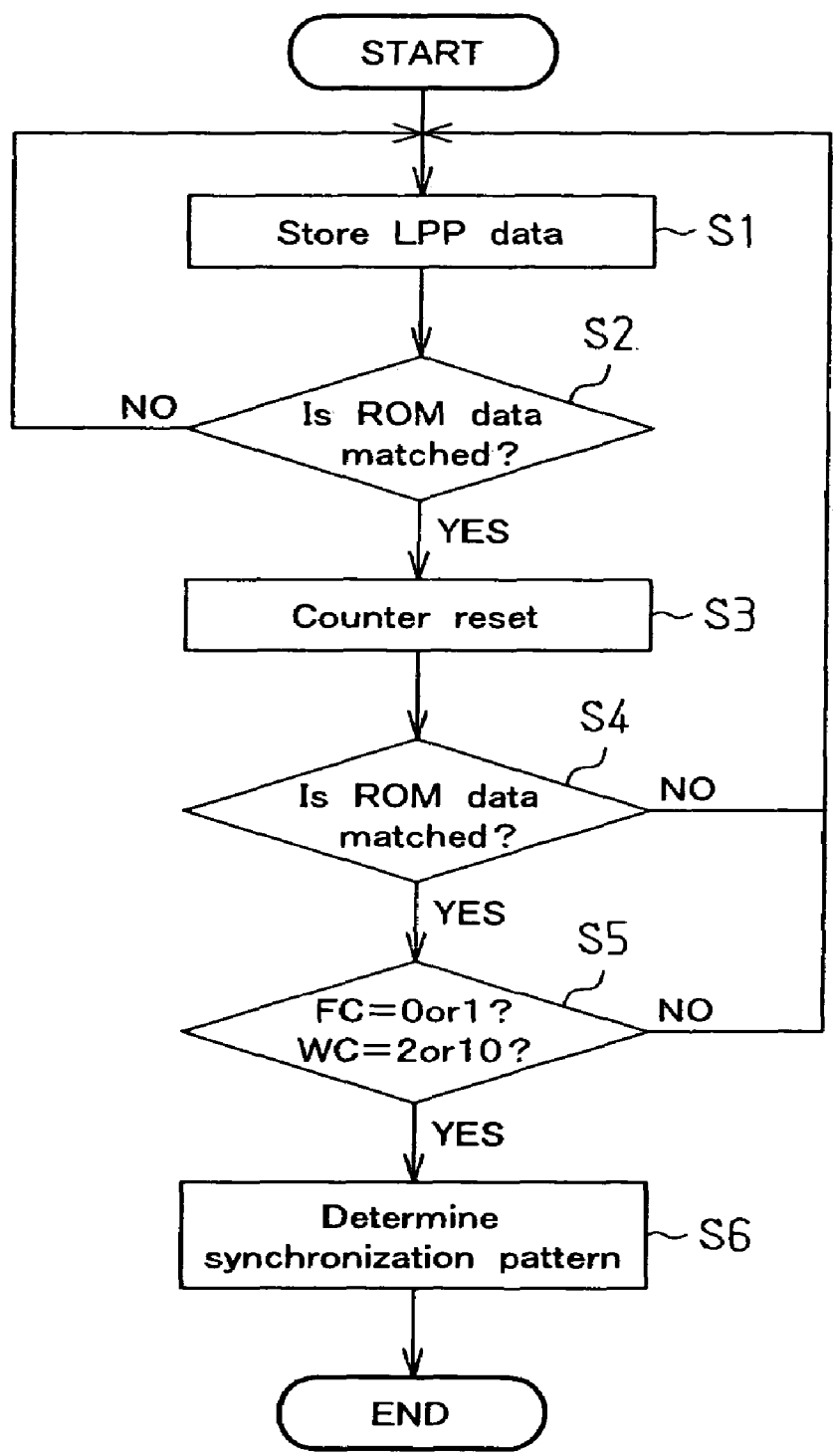
FIG. 5 is a flowchart illustrating the operation of the decoder of FIG. 3.

The operation of the decoder 100 will now be discussed with reference to the flowchart of FIG. 5. First in step S1, the shift register 1a stores the data corresponding to six frames of the LPP data that is successively received. After the data corresponding to six frames is stored in the shift register 1a, new data is sequentially re-written to sequentially update the storage data in the shift register 1a.

In step S2, from the data stored in the shift register 1a, the determination section 1c compares the data corresponding to six frames including the three bit synchronization pattern "1, 1, 1" or "1, 1, 0" with the data pattern stored in the ROM 1b. In the comparison process of step S2, the three bits included in the first to third columns, among the total of 48 bits corresponding to six frames, are compared differently from the other fourth to sixteenth columns. More specifically, as shown in FIG. 6, the three bits included in the first to third columns are compared with the predetermined pattern of "1, 1, 1" or "1, 1, 0". In the fourth to sixteenth columns, data is divided into column units and the three bit data of each column is compared with the three bit data of each stored column. Based on the comparison result, the determination section 1c determines whether the data stored in the shift register 1a matches the data stored in the ROM 16. In step S2, a constant tolerance value is set to perform determination when comparing each of the fourth to sixteenth columns. For example, when there is a one bit tolerance value, even if there is a difference of one bit between the three bits of the fourth column stored in the shift register 1a and the three bits of the fourth column stored in the ROM 1b, it is determined that the two pieces of data are matched. For the three bits of the first to third columns, it is determined that the three bits match the synchronization data only where there is complete matching. The process proceeds to the next step only when matching is confirmed in the first to third columns and the fourth to sixteenth columns.

In step S3, in response to the matching determination of step S2, the determination section 1c provides the detection signal GC to reset terminals of the first wobble counter 2 and the first frame counter 3 and resets the count values FC and WC of the counters 2 and 3. In the reset operation, the first wobble counter 2 resets the count value WC to "2". The first frame counter 3 resets the count value FC to "0" when the detected synchronization pattern is "1, 1, 1" in correspondence with frame 0. The first frame counter 3 resets the count value FC to "0" when the detected synchronization pattern is "1, 1, 0" in correspondence with frame 1. After the reset, the counting of each counter 2 and 3 is started.

In step S4, the determination section 1c sequentially compares the sequentially updated LPP data of the shift register 1a with the data stored in the ROM 1b and detects the next synchronization pattern from the LPP data. In this second detection, for example, referring to FIG. 7, the determination section 1c divides the data stored in the shift register 1a and the ROM 1b into units of first to sixteenth columns and compares the column units with one another. In step S4, a constant tolerance value is set for each column to perform match determination. When there is data that substantially matches the data stored in the ROM 1b, it is determined that the synchronization pattern has been detected. If matching data exists from when the count value FC of the first frame counter 3 is reset to when the count value FC next becomes "1", the process proceeds to subsequent step S5. If there is no matching data, the process proceeds to step S1.

In step S5, the comparison circuit 4 compares the first reference value S with the count value FC of the first frame counter 3 when the synchronization pattern is detected to determine whether the period during which the second synchronization pattern is detected matches the period corresponding to one sector. Simultaneously, the comparison circuit 4 compares the second reference value K with the count value WC of the first wobble counter 2 when the synchronization pattern is detected to determine whether the timing at which the synchronization pattern is detected matches the head of frame 0 or frame 1. When the two count values FC and WC respectively match the two reference values S and K, the process proceeds to step S6. Conversely, when the two count values FC and WC do not respectively match the two reference values S and K, the process returns to step S1.

When a matching determination is made in step S5, in step S6, the determination circuit 5 determines whether the proper synchronization pattern has been detected in step S2 and step S5. That is, in addition to the detection of the synchronization pattern in step S2, the determination of whether the synchronization pattern is proper is performed again in step S6. When determining that the detected synchronization pattern corresponds to the original synchronization pattern, the determination circuit 5 resets the count values WC and FC of the second wobble counter 6 and the second frame counter 7. Then, the second frame counter 7 provides the write timing generation circuit with a clock signal that is synchronized with the synchronization pattern.

In this manner, in addition to the detection of the synchronization pattern from the read LPP data, the decoder 100 of the present invention determines whether or not the detected synchronization pattern is proper based on whether the period during which the second synchronization pattern is detected corresponds to one sector. Accordingly, if the pattern of the LPP data and the period, during which the synchronization pattern is read, match with their original values, the detected synchronization pattern is determined as being the proper synchronization pattern. Thus, when there is a missing bit in an LPP or when noise causes different data to match the synchronization pattern, there would be no matching of either the pattern or the period. This ensures the prevention of erroneous recognition of the synchronization pattern.

In the preferred embodiment, the synchronization detection circuit 1 compares the LPP data of plural frames with the data stored in the ROM 1b. Unless a matching determination is obtained through the comparison, the process does not proceed to the count value comparison step. However, the present invention may be configured in a different manner. More specifically, the synchronization detection circuit 1 may monitor the LPP data that is received in a serial manner to detect only the three bits matching the synchronization data of "1, 1, 1" or "1, 1, 0" in the LPP data. In such a case, when the three matching bits are detected, the process proceeds to the count value comparison step regardless of the data other than the three bits. Such a configuration would also determine that the detected synchronization pattern is proper only when the synchronization pattern exists in the LPP data and the count value counted in the detection period of the second synchronization pattern matches the set count value corresponding to one sector. This prevents erroneous detection of the synchronization pattern.

The present invention is embodied in a DVD-R/RW system that uses a DVD-R/RW disc, or a device incorporating the decoder 100. However, the present invention may be embodied in any device that employs a recording medium using the land pre-pit technique.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A decoder for decoding reproduction data of a land pre-pit, wherein the reproduction data includes a synchronization pattern allocated in a predetermined cycle, the decoder comprising:
   a detection circuit for comparing the reproduction data with synchronization data corresponding to the synchronization pattern and generating a detection signal when the synchronization pattern of the reproduction data matches the synchronization data;
   a counter connected to the detection circuit for performing counting in response to the detection signal and generating a count value corresponding to a matching detection cycle of the synchronization pattern; and
   a determination circuit connected to the counter for comparing the count value of the counter with a reference value corresponding to an allocating cycle of the synchronization pattern and determining whether or not the synchronization pattern, detected to be matching the synchronization data by the detection circuit, is proper.

2. The decoder according to claim 1, wherein the reproduction data is configured by data from a plurality of sectors, with each piece of sector data including a plurality of frames, the synchronization pattern is allocated to each sector, and the reference value is determined in accordance with the number of frames in one piece of sector data.

3. The decoder according to claim 2, wherein the detection circuit compares the synchronization pattern of a first sector and reproduction data including a predetermined number of frames of a second sector prior to the first sector with the synchronization data and the corresponding data of the predetermined number of frames, the detection circuit generating the detection signal in accordance with the comparison result.

4. The decoder according to claim 1, wherein the counter resets the count value in response to the detection signal of the detection circuit.

5. The decoder according to claim 1, wherein the reproduction data includes data of a plurality of sectors, with each piece of sector data including a plurality of frames, a synchronization pattern is allocated to a first frame or a second frame of each sector, and the reference value is set in correspondence with the first or second frame of a piece of sector data.

6. A decoder for decoding data of a plurality of sectors, including first sector data and second sector data, each piece of sector data including a plurality of frames, with a synchronization pattern of a land pre-pit being allocated to a predetermined frame of each sector, the decoder comprising:
   a detection circuit for comparing the first sector data with synchronization data corresponding to the synchronization pattern and for generating a first detection signal when the synchronization pattern of the first sector data matches the synchronization data, the detection circuit comparing the second sector data with the synchronization data corresponding to the synchronization pattern after generating the first detection signal to generate a second detection signal when the synchronization pattern of the second sector data matches the synchronization data;
   a first counter connected to the detection circuit for performing counting in response to the first detection signal and for generating a count value, in response to the second detection signal, of a frame number when matching of the synchronization pattern of the second sector data is detected; and
   a determination circuit connected to the first counter for comparing the count value of the first counter with a reference value corresponding to the predetermined frame to which the synchronization pattern is allocated and for determining whether or not the synchronization pattern of the first sector, detected to be matching the synchronization data by the detection circuit, is proper based on the comparison result.

7. The decoder according to claim 6, wherein a cycle pattern of the land pre-pit is allocated to a first frame or a second frame of each sector.

8. The decoder according to claim 6, wherein the first counter resets the count value in response to the first detection signal.

9. The decoder according to claim 6, wherein the detection circuit compares the synchronization pattern of each piece of sector data and the data of a predetermined number of frames in a sector prior to each sector with the synchronization data and the corresponding data of the predetermined number of frames.

10. The decoder according to claim 6, further comprising a second counter connected to the determination circuit for initiating counting and for generating a clock signal synchronized with the synchronization pattern when the determination circuit determines that the synchronization pattern of the first sector is proper.

* * * * *